United States Patent
Alaimo

(10) Patent No.: US 12,443,165 B2
(45) Date of Patent: Oct. 14, 2025

(54) MICRO-SERVICE MANAGEMENT PLATFORM RELATING TO BATTERY MANAGEMENT

(71) Applicant: SAFT, Levallois-Perret (FR)

(72) Inventor: Stéphane Alaimo, Bordeaux (FR)

(73) Assignee: SAFT (France), Paris (FR)

( * ) Notice: Subject to any disclaimer, the term of this patent is extended or adjusted under 35 U.S.C. 154(b) by 604 days.

(21) Appl. No.: 17/784,900

(22) PCT Filed: Dec. 11, 2020

(86) PCT No.: PCT/FR2020/052404
§ 371 (c)(1),
(2) Date: Jun. 13, 2022

(87) PCT Pub. No.: WO2021/116633
PCT Pub. Date: Jun. 17, 2021

(65) Prior Publication Data
US 2023/0011254 A1    Jan. 12, 2023

(30) Foreign Application Priority Data
Dec. 13, 2019  (FR) .................. FR1914436

(51) Int. Cl.
*G05B 19/4155*    (2006.01)
(52) U.S. Cl.
CPC .......... *G05B 19/4155* (2013.01); *G05B 2219/31449* (2013.01)
(58) Field of Classification Search
CPC ...... G05B 19/4155; G05B 2219/31449; G05B 2219/31196; H01M 2010/4271; H01M 10/425; H01M 10/482; Y02E 60/10; Y04S 40/18; H04L 67/025; H04L 67/125
See application file for complete search history.

(56) References Cited

U.S. PATENT DOCUMENTS 11,616,259 B1 * 3/2023 Dhawan ............ H01M 10/4257
320/109
2017/0201425 A1 7/2017 Marinelli et al.
2018/0164791 A1 6/2018 Debes et al.
2018/0295187 A1 10/2018 Sabata et al.
(Continued)

FOREIGN PATENT DOCUMENTS

CN    107612959 A1    7/2018
WO    2017147355 A1    8/2017
WO    2018065629 A1    4/2018

OTHER PUBLICATIONS

The Intellectual Property Office of The Republic of France—Search Report, pertaining to FR Application No. 1914436, dated Oct. 19, 2020, 14 pages.
(Continued)

*Primary Examiner* — Farzana B Huq
(74) *Attorney, Agent, or Firm* — Sunstein LLP

(57) ABSTRACT

The present invention relates to a service platform implemented by one or more computers. The platform comprises one or more micro-services, each micro-service having a standardized generic structure comprising: a subservice implementing a business function, a messaging sub-service. The platform also includes a communication system for exchanging data and messages, referred to as unified communication system.

11 Claims, 7 Drawing Sheets

(56) References Cited

U.S. PATENT DOCUMENTS

2023/0325816 A1\* 10/2023 Cella ...................... G06Q 20/02
2024/0291290 A1\* 8/2024 Trippel ................ H02J 7/0042

OTHER PUBLICATIONS

International Searching Authority—International Search Report, pertaining to International Application No. PCT/FR2020/052404, dated Mar. 11, 2021, together with the Written Opinion of the International Searching Authority, 15 pages.

Ivarez-Valera et al., "KaliGreen: A distributed Scheduler for Energy Saving", Procedia Computer Science, vol. 141, pp. 223-230, 2018.

\* cited by examiner

[Fig. 1]

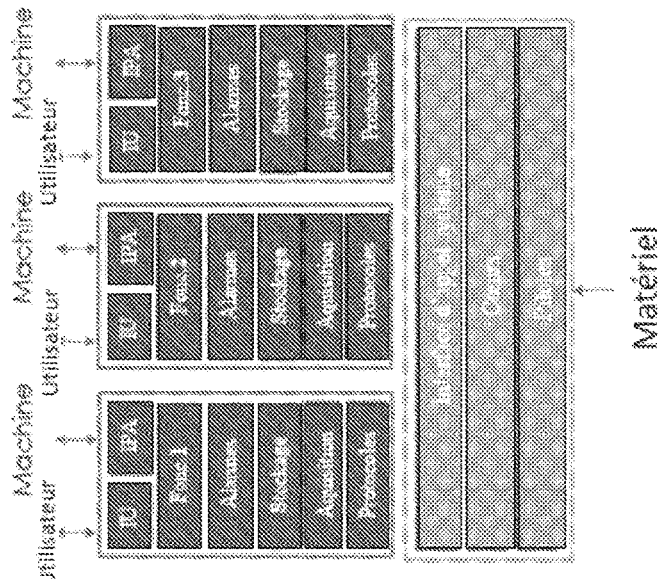
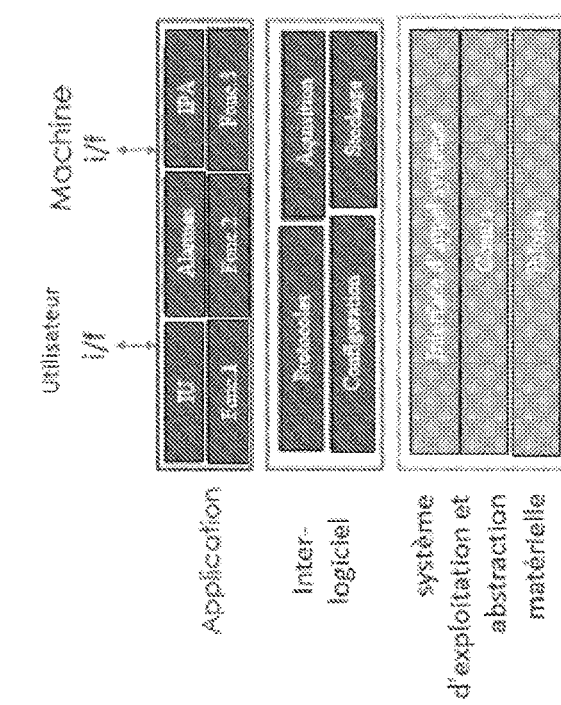
Fig. 3

MICRO-SERVICE MANAGEMENT PLATFORM RELATING TO BATTERY MANAGEMENT

CROSS-REFERENCE TO RELATED APPLICATIONS

This application is a national phase entry of International Patent Application No. PCT/FR2020/052404 filed Dec. 11, 2020, which claims priority to French Patent Application No. FR1914436 filed Dec. 13, 2019. Each of the above-described appplications is incorporated herein by reference in its entirety.

FIELD OF THE INVENTION

The present invention relates to the technical field of service platforms using micro-services for an industrial control-command system.

TECHNICAL BACKGROUND

The execution of the management functions for managing a complex industrial system generally relies on an ICT (information-communication technology) infrastructure. These functions include in particular operational monitoring, remote programming and diagnostics of machines and equipment units, production monitoring and diagnostics, as well as human/machine interfaces that enable and facilitate interactions among human operators.

For example, an industrial system may be a Battery Management System (referred to by the abbreviation BMS) which is an electronic control system that has multiple functions in an energy storage system based on one or more batteries. These functions include, but are not limited to, monitoring the state of the battery (state of charge, state of health, temperature, electric current flowing there-through, etc); checking/monitoring of the power connections of the battery with a charge; checking/monitoring of the charging; monitoring of the operational safety of the battery; and functions that ensure battery safety and security.

In general, a system management ICT infrastructure for managing an industrial system comprises a management unit that executes the services and is connected to one or more networks to which the machines and equipment units of the system are also connected. The data and information concerning the machines and equipment units are transmitted by the latter to the management unit, and the computing unit accordingly executes the business functions on the basis of the information items received, and sends relevant commands to the machines and equipment units. FIG. 7 illustrates an example of an industrial system in which the equipment units (A, B), the sensors (1, 2, 3), a host system, and a user are connected to an industrial process management component. The latter receives, for example, data, measurements, configuration commands, configurations; and transmits, for example, commands, data, displays, etc. The information flows are centralized on the said management component.

However, it is possible for supervised industrial systems to attain extremely high levels of complexity such that it becomes difficult to ensure both the level of availability and scalability (addition of a new element or a function) thereof. Indeed, such systems group together diverse, heterogeneous subsystems, having a variety of interfaces (physical serial links, Ethernet, CAN, wireless, and with different protocols), different business logic processes, algorithmic computations and data storage elements, and are conventionally implemented in a nested fashion within a monolithic architecture. All these characteristics serve to limit the scalability and level of availability thereof.

Therefore, there are currently no existing ICT management platforms that offer both a high level of availability without resorting to redundancy as well as a significant degree of scalability.

SUMMARY OF THE INVENTION

The present invention uses a "service" approach that relies on a micro-services architecture. For this purpose, the invention provides a service platform that is implemented by one or more computer(s). The platform comprises one or more micro-service(s). Each micro-service has a standardized generic structure comprising:
  a sub-service implementing a business function;
  a messaging sub-service;
The service platform in addition includes a unified communication system for enabling the exchange of data and messages.

Such a platform improves the level of availability of a management platform, while ensuring both a high level of availability without having to resort to redundancy as well as a significant degree of scalability. Other enhancements will be discussed below.

The service platform may be able to implement a battery management system for managing a battery and its auxiliary equipment units; thus the proposed platform is a service platform, implemented by one or more computer(s), for managing a battery and its auxiliary equipment units.

According to various different embodiments, any combination comprising at least one of the following characteristic features may be implemented:
  each micro-service in addition includes a user and/or machine interface;
  each micro-service in addition includes at least one micro-service management function;
  the said at least one management function is selected from among: a logging function for logging the system executing the micro-service and/or the micro-service being executed; an alarm management function for managing the alarm(s) sent and/or received by the micro-service; a configuration management function for managing the configuration of the micro-service; a save and restore function for saving and restoring a current state of the micro-service;
  a log centralization service for centralizing logs on which are stored log messages formatted and sent by the logging function.
  the logging function adds a metadata item to each log message formatted and sent by the logging function, the metadata items comprising: a metadata item PRIORITY, that takes a value selected from the following values: TRACE; DEBUG; INFO; WARN; ERROR; CRITICAL; a metadata item TYPE, that takes a value selected from the following values: a value SYSTEM indicating a message linked to the operation of the micro-service in question; a value OPERATIONAL indicating a message linked to the business functions; a metadata item AUDIT, that takes a value selected from the following values: a value TRUE, indicating that the message is to be treated as security related; a value FALSE, indicating that the message is to be treated as non-security related;

the unified communication system comprises the use of sockets for inter-micro-service communication, either local or via a TCP/IP network, this selection being configured by the configuration management function for managing the configuration of the micro-service;

the sockets for inter-micro-service communication use a stateless proxy which connects a micro-service that is publishing one or more message(s) concerning one or more topic(s) of the messaging system with one or more micro-service(s) that have subscribed to the said one or more messaging system topic(s);

the messaging sub-service includes:

a subscription function for subscribing to one or more messaging system topic(s);

a publish function for publishing to a topic of the messaging system;

a send request function for sending a request via the messaging system;

a response function for responding to a request received via the messaging system.

the subscription function includes subscribing to one or more topic(s) of the messaging sub-service, formatting and writing the data contained in the messages associated with the said one or more topic(s) subscribed to a local database that is suitable for the storing of time-stamped data;

the unified communication system is asynchronous, non-blocking, and point to multipoint or multipoint to point;

one or more additional service(s) are provided by the operating system of one or more computer(s) executing one or more micro-service(s);

the one or more additional service(s) are selected from among: an operating system initialization service; a micro-services start-up service; a central message storage and management service for storing and managing log messages in a database;

a daemon (or French "demon") executed by a computer, the daemon performing at least one of the following tasks: determining whether or not the one or more micro-service(s) is(are) functioning correctly, and restarting the same as may be necessary;

monitoring the proper functioning of the operating system of the computer executing the micro-service and restarting it as may be necessary;

each micro-service is executed as a single process and each sub-service of the micro-service is executed as a thread; a thread (as per the accepted term and definition standardized by ISO/IEC 2382-7: 2000) is similar to a process with the difference being that a process has its own specific memory that is not shared with other processes whereas the threads of a same given process have a common shared memory.

The invention also relates to a proposed use of the service platform according to the invention in order to implement a battery management system for managing a battery and its auxiliary equipment units, the battery being formed of one or more branch(es) connected in parallel, each branch comprising one or more module(s) connected in series, each module comprising one or more electrochemical element(s).

This use may further include at least one auxiliary equipment unit which is selected from among a fire extinguishing system; an air conditioning system; a physical access monitoring system; an electrical power measurement system.

Also provided is an assembly comprising:

one or more battery branch(es) connected in parallel and forming a battery, each branch of the battery comprising one or more module(s) connected in series, each module comprising one or more electrochemical element(s);

one or more computer(s);

a service platform according to the invention implemented by the said one or more computer(s), in which the micro-services implement battery management business functions for managing the battery and its auxiliary equipment units; and one or more control-command component(s) of the branches, which execute the connection/disconnection orders and which provide measurements of the parameters of the branches, the modules, and the electrochemical elements.

Also provided is an assembly comprising:

one or more battery branch(es) connected in parallel and forming a battery, each branch of the battery comprising one or more module(s) connected in series, each module comprising one or more electrochemical element(s);

at least one auxiliary equipment unit of the battery;

one or more computer(s);

a service platform according to the invention implemented by the said one or more computer(s); and one or more control-command component(s) of the branches, which execute the connection/disconnection orders and which provide measurements of the parameters of the branches, the modules, and the electrochemical elements.

According to various different embodiments, any combination comprising at least one of the following characteristic features may be implemented for the assembly:

one or more of the business functions are selected from the following: determination of the connection/disconnection to/from the electrical network of at least one branch of the battery; computation of the current setpoints applicable to the charging and the discharging of the battery; computation of the level of charge of the battery; computation of the level of battery life;

two or more assemblies of battery branches connected in parallel respectively forming two or more batteries and in which the service platform in addition comprises a micro-service implementing a data aggregation business function for aggregating the data from one or more of the other business functions.

the service platform in addition includes one or more micro-service(s) capable of sending the data exchanged over the unified communication system to a remote storage system in order to be stored therein, the remote storage system moreover also being coupled with a machine learning system capable of effectuating its training on the stored data;

the service platform in addition includes a service update micro-service for updating the other micro-services;

the service platform in addition includes a software update micro-service for updating the software programs of the control-command component(s) of the branches;

at least one auxiliary equipment unit is selected from among:

a fire extinguishing system;

an air conditioning system;

a physical access monitoring system;

an electrical power measurement system.

BRIEF DESCRIPTION OF THE FIGURES

The embodiments of the invention will now be described by way of non-limiting examples of the invention, and with reference to the figures, wherein:

FIG. 3 illustrates a comparison between monolithic management of services and management via micro-services;

DESCRIPTION OF EMBODIMENTS OF THE INVENTION

The present invention relates to a service platform implemented by one or more computer(s). The service platform provides a system management ICT infrastructure for managing an industrial system. The service platform manages one or more service(s) in the form of micro-services. A service included within the platform is in the form of a micro-service. If the platform manages a plurality of services, it is possible that there could be as many micro-services as there are services. The micro-services may be executed on one or more computer(s), that is to say, one computing unit may execute one or more micro-service(s).

The term micro-service refers to a software architecture that structures an application as a set of services with each performing one single unitary function and being weakly coupled to each other. The micro-services should be as independent of each other as possible, and they should communicate with each other independently of each other using application programming interfaces (API s) that are independent of the programming language.

Each micro-service has a standardized generic structure. A standardized generic structure is described using a typical micro-service model commonly referred to as a "template". The typical micro-services template standardizes the construction and operation of the micro-service. If the platform includes a plurality of micro-services, each micro-service will conform to the standardized generic structure.

The standardized generic structure which applies to each micro-service comprises at a minimum the following two sub-services. The first sub-service is a sub-service implementing a business function. The business function defines a specific role which will be rendered by the micro-service within the context of its use in the industrial system that is managed by the management platform. The business function may also be known as the business functionality. The business function or business functionality may include, for example, a business application, a business process, or indeed even a business service.

The second sub-service is a messaging sub-service which enables the micro-service to communicate with an element that is external thereto, for example another micro-service. The messaging sub-service defines an Application Programming Interface (API) that allows the micro-service to access a messaging system that is common to other micro-services and thereby to communicate with them.

The service platform comprises a data and message exchange system which is a data and message transmission device shared among a plurality of components of the platform, for example the components are micro-services. This mechanism is hereinafter called "unified communication system".

Figure 1:
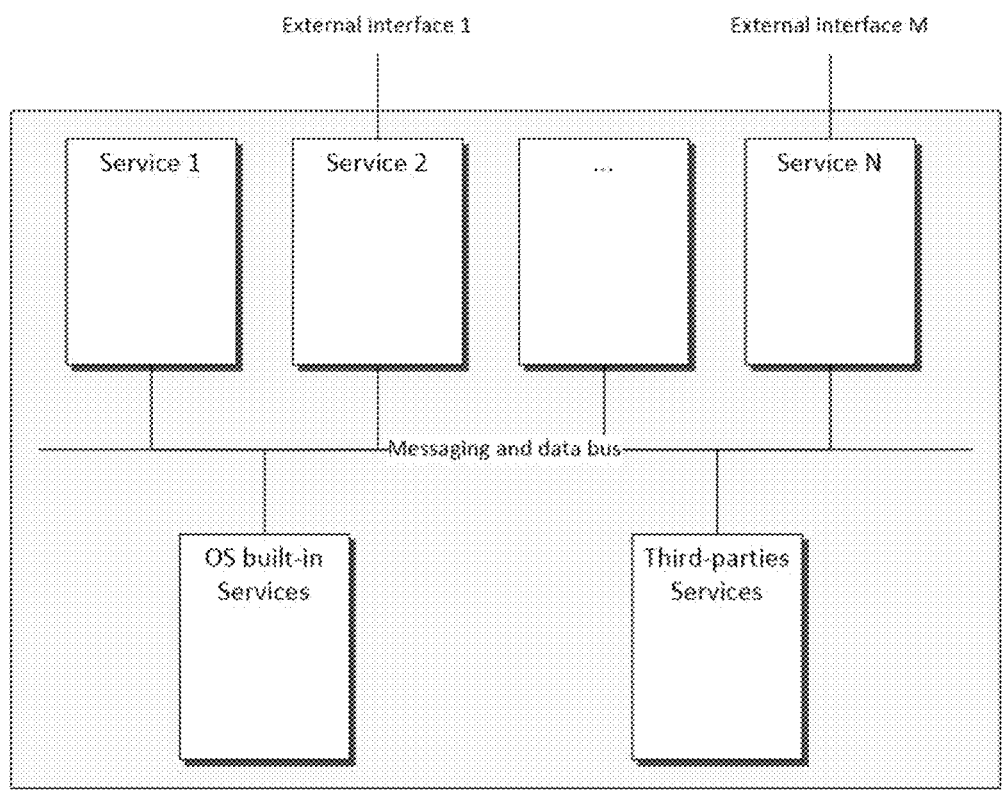
FIG. 1 is an example of a communication architecture for enabling inter micro-services communication.

FIG. 1 illustrates an example of a platform according to the invention in which N+2 services are represented and communicate with each other via the unified communication system. The set of services represented in FIG. 1 may be executed by a single computer or even by a plurality of computers (and a maximum of N+2 computers).

The platform according to the invention serves to enable industrial control which is interfaced with diversified subsystems having various interfaces (serial link, Ethernet, CAN, and with different protocols) and the business logic thereof. The service platform according to the invention provides a high level of availability. Indeed, the proposed architecture makes it possible to achieve high levels of availability thanks to the micro-services being designed to be highly independent therebetween which is notably ensured by the fact that each micro-service implements one single business function and that it is able to communicate in a non-blocking manner with one or more other micro-services via the unified communication system. Thus when one of the micro-services is no longer working, the entire platform does not get dragged down with it, and thus continues to function. The service platform according to the invention also provides for high scalability and extensibility. Indeed, the addition of a new micro-service is possible without modification and without impact on the already existing micro-services; the only condition necessary being that the material resources that enable the execution thereof be made available. In addition, since the micro-services may be on different host machines, distribution of the load (load balancing) is facilitated and can be reconfigured as needed.

FIG. 3 illustrates the conceptual differences between a monolithic architecture used in known service management platforms for managing the services of an industrial system, and a platform based on micro-services according to the invention. In particular, each micro-service being independent in respect of its execution both enhances the robustness of the platform in the event of failure of any given micro-service, while also enhancing the deployment of the solution since each micro-service can be individually adapted to a new context, for example a new, more recent equipment unit.

In the examples, each micro-service may include a user interface and/or a machine interface. A user interface enables a user to interact with the micro-service, for example in order to control it. A machine interface enables a micro-service to communicate with an equipment unit or a machine that is external to the platform. In FIG. 1, the service 2 and the service N can exchange information and/or be controlled by an equipment unit or a machine that is external to the platform) via a machine interface; this is thus referred to as an API. The user interface and/or the machine interface may be implemented as a separate sub-service.

In the examples, each micro-service may include one or more management functions for managing the micro-service. A management function makes it possible to control the execution of the micro-service.

In the examples, the one or more management function(s) of the micro-service may be a logging function. The logging may relate to the system executing the micro-service and/or the micro-service that includes the logging function, or even another micro-service. The term logging refers to the sequential recording, in a file or a database of all the events affecting the system executing the micro-service and/or the micro-service that has the logging function and/or another micro-service. The logging may be time stamped.

In the examples, the logging function may include a log centralization service in order to store the log messages. The log centralization service may be included within the logging function (that is to say, internal to the logging function), or indeed it may be a stand-alone service autonomous from the logging function (that is to say, external to the logging function). In the latter case, the log centralization service may be a micro-service of the service platform. The log centralization service may be used by one logging function of one micro-service and/or by a plurality of logging functions of a plurality of micro-services.

In the examples, the formatting of the log messages performed by the logging function may include the addition of a metadata item to each log message. The metadata items serve the purpose of improving the processing of the log data.

In the examples, a metadata item PRIORITY may be introduced into the messages by the logging function. This metadata item provides information as to the level of criticality of the message according to the value associated with the metadata item PRIORITY. In order of increasing criticality, the associated value may be selected from the following values:
  TRACE: the content of the message does not include any particular current event;
  DEBUG: the content of the message may include information items relevant to a future current event;
  INFO: the content of the message includes information items relevant to a current event;
  WARN: the content of the message includes information items relevant to a problematic current event;
  ERROR: the content of the message includes information items for a serious current event;
  CRITICAL: the content of the message includes information items for a current critical event.

In the examples, a metadata item TYPE may be introduced into the messages by the logging function. This metadata item is accompanied either by a value SYSTEM which indicates that the message is linked to the operation of the micro-service which sent it, or by a value OPERATIONAL indicating a message linked to, and/or to the business functions of a micro-service, for example the micro-service that sent the message.

In the examples, a metadata item AUDIT may be introduced into the messages by the logging function. This metadata item AUDIT is accompanied by a value TRUE indicating that the message should be treated as security related, or a value FALSE indicating that the message should be treated as non-security related.

The previous examples of metadata items introduced into the messages by the logging function may be combined with one another.

In the examples, one of the management functions for managing the micro-service may be an alarm management function for managing the alarm(s) sent and/or received by the micro-service. An alarm allows the micro-service to signal a level of criticality for an event which may be a present event (that is to say, an event which is in the process of occurring, or indeed even a past event (that is to say, an event that has ended) or even a future event (that is to say, an event that could possibly occur, for example it is predicted). In a general manner, the term 'current event' is used to refer to these different types of event.

In the examples, one of the micro-service management functions may be a configuration management function for managing the configuration of the micro-service. The configuration of the micro-service includes all of the defined parameters that determine the manner in which the micro-service starts and/or is executed and/or is stopped.

In the examples, one of the management functions for managing the micro-service may be a save and restore function for saving and restoring a current state of the micro-service. The current state of the micro-service contains the data structures and the current values thereof that serve to enable the micro-service to restart with these initialisation values rather than with the default values (for example zero).

The service platform includes a unified communication system that enables the exchange of data and messages.

In the examples, the unified communication system includes the use of sockets. The sockets of a micro-service are capable of enabling local inter-micro-service communication as well as inter-micro-service communication via a TCP/IP network. It is understood that any network protocol that enables inter-micro-service communication may be used, and is not limited to TCP/IP. The sockets offer a model that enables Inter Process Communication (or IPC) in order to make it possible for various processes to communicate just as well on the same machine as through a TCP/IP network.

The selection of local communication (for example when a plurality of micro-services are executed on the same computer) or communication via a TCP/IP network (for example when a plurality of micro-services are executed on a plurality of computers) is configured by the micro-service configuration management function.

In one example, the sockets for inter-micro-service communication use a stateless proxy which connects a micro-service that is publishing one or more message(s) concerning one or more topic(s) of the messaging system with one or more micro-service(s) that have subscribed to the said one or more messaging system topic(s). A stateless proxy is a proxy whose sole function is to transmit the messages that it receives to the one or more recipient(s) of the messages. The proxy does not store any information concerning the type of information and/or transaction that it transmits and/or executes. Such a proxy has the advantage of offering extreme simplicity in the provision of a multi-point to multi-point service, that is to say a service in which a plurality of micro-services that publish can communicate with a plurality of micro-services that subscribe to the published items, while also limiting the number of sockets and therefore the consumption of computing and memory resources on the computer(s) that is(are) executing the micro-services. In addition, it greatly facilitates the addition of new participants to the messaging system.

Figure 4:
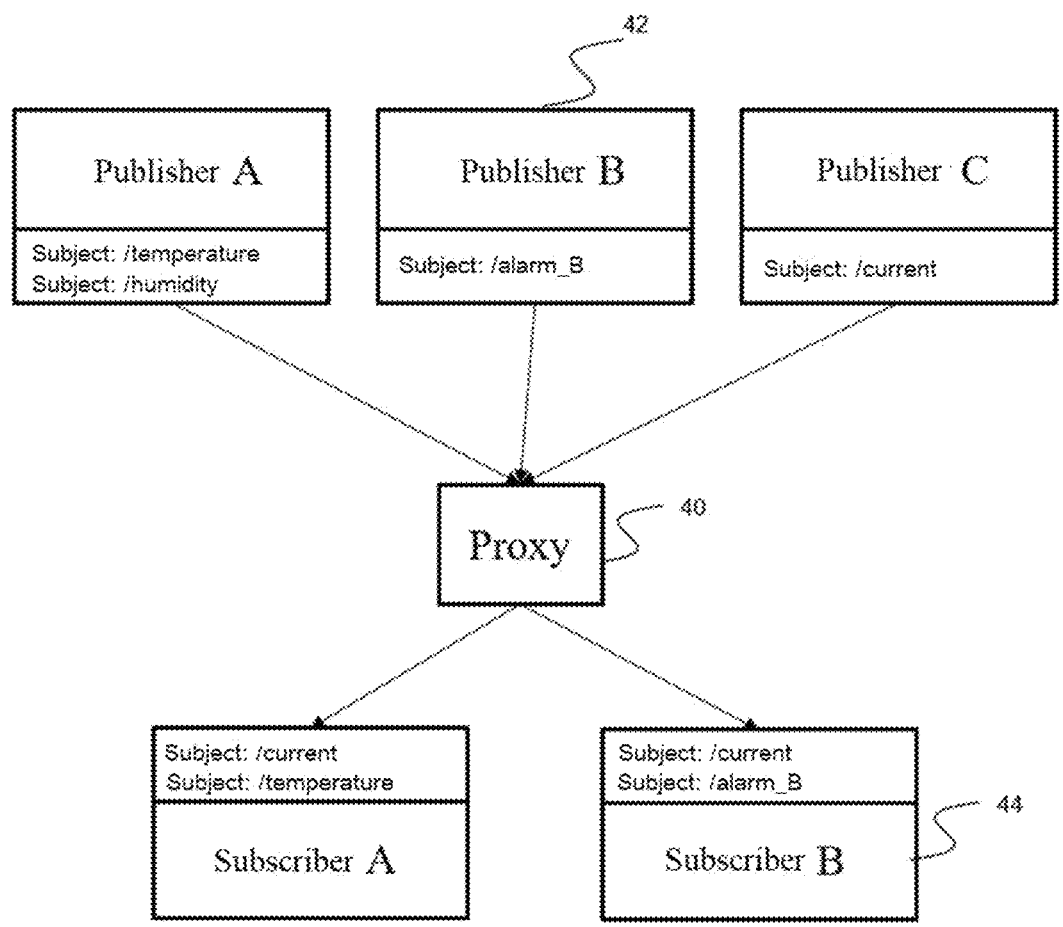
FIG. 4 is an example of the messaging system including publishers and subscribers subscribed to topics of the messaging system.

FIG. 4 is an example of implementation of an inter-micro-service communication. In this example, a ZeroMQ© messaging API is used as a backbone for communications between the micro-services. This is a middleware level API based on IPC (Inter Process Communication) sockets. It is understood that use may be made of any other messaging API that provides the means to enable communication among the micro-services, preferably offering a subscription function for subscribing to one or more messaging system topic(s), for example the messaging API nanomsg©. ZeroMQ© is a high performance asynchronous messaging library, intended for use in distributed or concurrent applications. The API of the library is designed to resemble that of BSD sockets. The ZeroMQ© version used in this example is the version 4.3.2 dated Jul. 8, 2019. It will be understood that version 4 or higher may be used in examples of implementation. The ZeroMQ© proxy is a stateless intermediary which effects the connection between (that is to say it connects) the publisher micro-services and the subscriber micro-services. The ZeroMQ© proxy is not a message broker, that is to say it does not perform any conversion of messages. The ZeroMQ© proxy is a stateless proxy, that is to say it has no intelligence and does not perform any type of processing on the messages; it is limited to merely receiving and transmitting messages. It is understood that a stateless proxy is able to accept new micro-services easily, dynamically and without any interruption of the communications on the unified communications system.

With continued reference to FIG. 4, the stateless proxy 40 receives on a first interface (denoted XSUB) the entire set of micro-services 42 that publish, and on a second interface (denoted XPUB) the entire set of micro-services (44) that are subscribed to the messages from one or more or all of the micro-services. The stateless proxy 40 therefore effects the link between the publishers on the one hand, and the subscribers on the other, that are connected to the two interfaces. The data sent by the micro-services are serialised on input (at the level of the XSUB interface) and deserialised on output (at the level of the XPUB interface) using for example the protocol Protobuff (Protocol Buffer Format) which is a binary exchange format for serialising the structured data.

In the examples, the unified communication system may be asynchronous, for example with ZeroMQ©. The unified communication system may be non-blocking, that is, one message cannot prevent other messages from being transmitted. More generally, the non-blocking unified communication system allows the micro-service to perform other tasks even if a sent message is pending, or indeed even when an expected response to a message has not reached the micro-service. The unified communication system can also be point to multipoint or else multipoint to point; a given micro-service can therefore send messages to a plurality of micro-services, and conversely a plurality of micro-services can send messages to a given micro-service.

The messaging sub-service is discussed here below. In the examples, the messaging sub-service may include one or more of the functions discussed in the examples that follow, and in one example it includes all of them. The messaging sub-service may include a subscription function for subscribing to one or more messaging system topic(s). A messaging topic may be determined by, but is not limited to, a topic identifier such as for example a measurement name coming from a micro-service interfaced with one or more external sensors such as for example 'Temperature' or 'Current'. A topic identifier may also be a message category that is useful for the operation of the system itself, for example 'Alarm'.

In one example, the subscription function includes subscribing to one or more messaging system topic(s), formatting and writing the data contained in the messages associated with the said one or more topic(s) subscribed to a local database that is suitable for the storing of time-stamped data. The database may be a local database, that is, each micro-service stores data on a database that is located on the computer which is executing the micro-service. The database may be a remote database, for example located on a different computer other than the one which is executing the micro-service.

The messaging sub-service may include a publish function for publishing in a messaging system topic. This publish function enables the micro-service to send messages for a messaging topic.

The messaging sub-service may include a send request function for sending a request via the messaging system. A request is a message that awaits a response from one or more other micro-services. Generally, a request is a computer language used to access data, for example the data from a database or other information systems. In one example, the messaging sub-service also includes a response function for responding to a request received via the messaging system. This function therefore enables the said micro-services to respond to the request sent by one of the micro-services.

In the examples, the entire set of inter-service communications, that is to say the sending of messages between the different sub-services of the platform's micro-services, passes through the messaging sub-service. In one example, an exception may relate to the case where the service platform comprises an interface that makes it possible to interact with a user. The interface is provided by a micro-service which uses only local data for better performance, in particular in order to offer greater responsiveness to the user. In another example, a local web interface is provided to a user by a micro-service, and the web interface reads the information items in a local database of the computer that is executing this micro-service, without going through the messaging system.

A micro-service is a software element of the platform that comprises a sub-service implementing a business function and a messaging sub-service. The sub-services that implement the business function perform the services of an industrial system, and the messaging sub-service offers the sub-services implementing a business function the means to communicate with each other, by relying in particular on the unified communication system. It should be recalled that a service is a functionality or part of a functionality made available by a software component for the purpose of performing a particular task. In order to limit the number of micro-services managed by the platform, and in the examples, one or more additional service(s) may be provided by the operating system of one or more computer(s) executing one or more micro-service(s). In other words, the additional services which are offered by the computers executing the micro-services may be exploited by the platform according to the invention. For example, the open source utility "monit" (version 5 or later), which falls under the category of daemons, may be in charge of monitoring the micro-service and the computer executing the micro-service. This utility can measure the computer resources (processor, memory, disks, network, etc) used by the micro-service, be a watchdog that determines the processes which are frozen.

In the examples, the additional services may be selected from the following services. It will be understood that these are by way of non-limiting examples and that any service that may be provided by an operating system may constitute an additional service. Thus, an additional service may be an operating system initialisation service which controls the execution of a plurality of programmes upon the operating system being started, ie booted. For example, the init programme in UNIX/LINUX systems has a role in the primary boot process that consists in controlling the execution of a plurality of programmes. An additional service may be a micro-services startup (boot) service; for example a service which sequences the start-up of all the micro-services according to a certain order, and which verifies the proper start-up thereof. An additional service may be a central storage and management service for storing and managing the log messages in a database.

Also with the aim of limiting the number of micro-services managed by the platform, and in the examples, one or more daemons executed by a computer may be used. A daemon is a type of computer programme, a process, or a set of processes that gets executed in the background rather than under the direct control of a user. The daemons are often started up upon the loading of the operating system, and are generally used to respond to network requests, hardware activity, or other programmes by executing certain tasks. A daemon can thus perform at least one of the following tasks: (i) The daemon determines whether or not one or more micro-service(s) is(are) functioning correctly; (ii) The daemon can restart a micro-service if it is not functioning correctly; (iii) The daemon can monitor the proper functioning of the operating system of the computer executing the micro-service; (iv) The daemon can restart the operating system if it is not functioning correctly.

The micro-services are programs executed by a computer. The term 'computer' refers to a programmable information processing system which operates by reading a set of instructions, organized into programs, which make it execute logical and arithmetic operations. A computer includes at least a computing unit (for example, a CPU), and a memory storage that is in communication with the computing unit, which stores the computer program.

Figure 5:
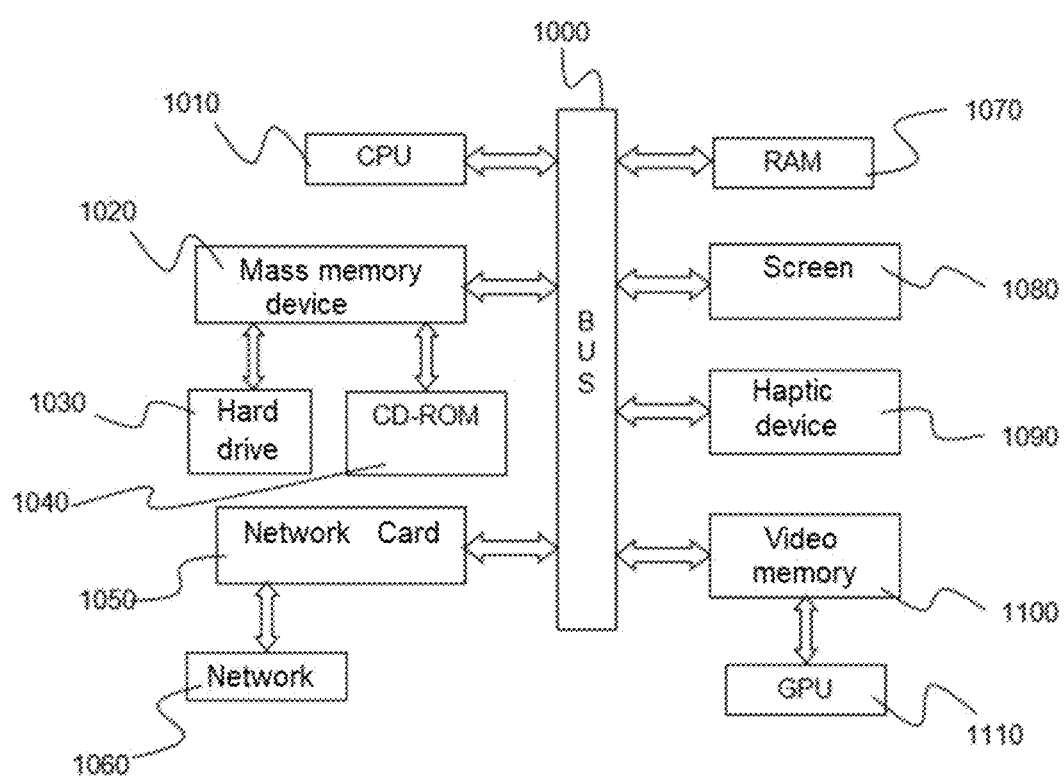
FIG. 5 is an example of a computer that is capable of executing a micro-service.

FIG. 5 shows an example of a computer that provides the means to execute a micro-service according to the invention, and which may possibly be included in a platform according to the invention. The computer of the example comprises a central processing unit (CPU) 1010 connected to an internal communication bus 1000, a random access memory (RAM) 1070 also connected to the bus. The RAM is therefore in communication with the central processing unit. The computer may be provided with a graphics processing unit (GPU) 1110 which may be associated with a video random access memory 1100 connected to the bus. Video RAM 1100 is also referred to in the art by the term frame buffer memory. The computer may include a mass memory storage device controller 1020; the controller manages access to a mass memory storage device, such as a hard disk 1030. The mass memory storage devices are suitable for the actual execution of computer program instructions and include all forms of non-volatile memory, including by way of example semiconductor memory devices, such as erasable programmable read only memory (EPROM), electrically erasable programmable read only memory (EEPROM), and flash memory devices; magnetic disks such as internal hard disks and removable disks; magneto-optical discs; and CD-ROM disks 1040. All of the aforementioned may be supplemented or incorporated into specially designed application specific integrated circuits (ASICs). The computer may include a network card 1050 which manages access to a network 1060. The client computer may also include a haptic device 1090 such as a cursor control device, a keyboard, or the like.

The computer can store on its random access memory, or else on a mass memory storage, one or more computer programs. The computer program may include instructions that may be executed by the computing unit of the computer, the instructions comprising the means for causing the abovementioned computer to implement all or part of the platform according to the invention. The program may be recordable on any data storage medium, including the random access memory (RAM) and/or mass memory storage unit of the system. The program may for example be implemented in digital electronic circuits, or in computer hardware, firmware, software or combinations thereof. The program may be implemented in the form of an apparatus, for example a product incorporated in a tangible manner within a machine readable storage device for execution by a programmable processor. The processor (the central processing unit) can thus be programmed and coupled so as to receive the data and instructions coming from a data storage system, from at least one input device and at least one output device; and so as to transmit the data and instructions to such a system. The application program may be implemented in a procedural programming language or high level, object-oriented programming language, or in assembly or machine language if necessary. In all cases, the language may be a compiled or interpreted language. The program may be a full installer or an update program. The application of the program on the system results in any event in instructions for the implementation of the platform.

The platform may be distributed, that is to say, it is implemented (executed) by a plurality of computers, rather than just one. It should thus then be understood that the program of the platform accordingly could be made up of a plurality of subroutines (subprograms) executed by a plurality of machines, thereby forming the service platform according to the invention. When the platform is implemented on multiple computers, each computer executes at least one micro-service. FIG. 1 as previously discussed illustrates an example of a platform that may be executed by a plurality of computers.

In the examples, each micro-service executed by a computer may be like a single process. Each sub-service of the micro-service may be executed as a thread. A thread (as per the accepted term and definition standardized by ISO/IEC 2382-7: 2000) is similar to a process with the difference being that a process has its own specific memory that is not shared with other processes whereas the threads of a same given process have a common shared memory. The "multi-use of threads" of the subservices of a micro-service contributes to the performance of the micro-service because the threads are executed concurrently, in parallel.

Figure 2:
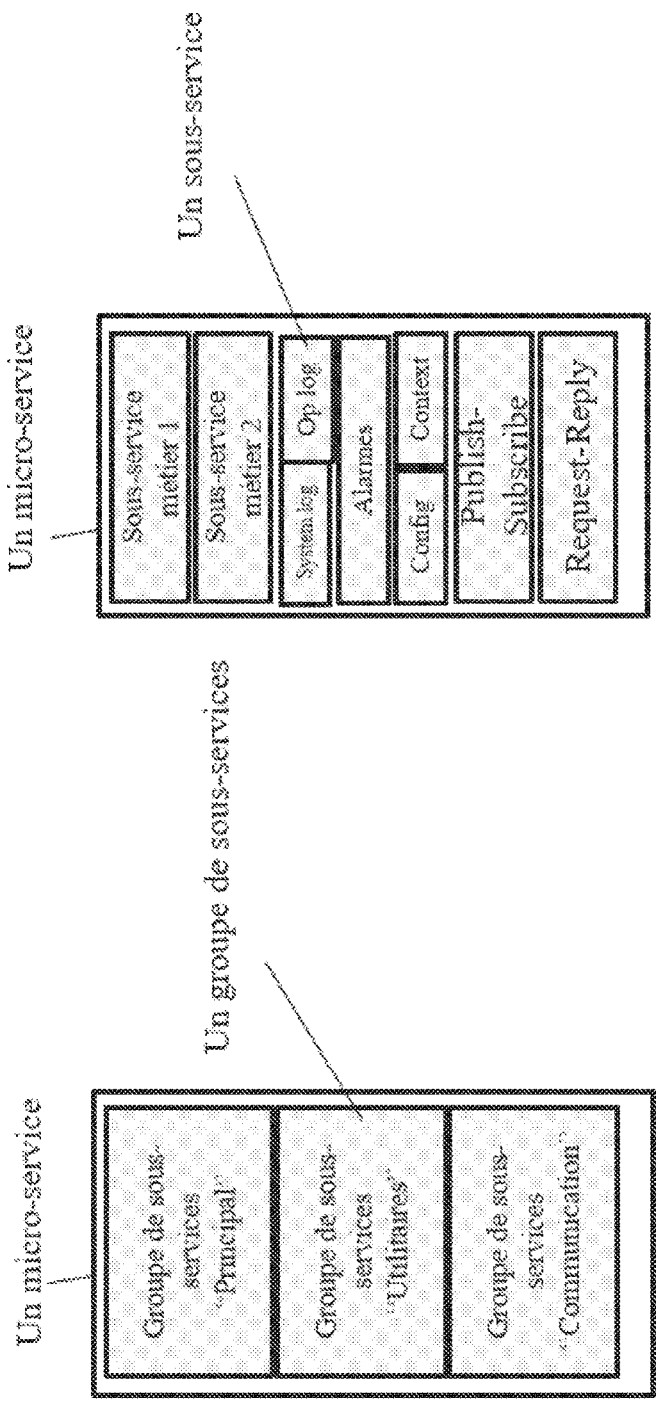
FIG. 2 is an example of a typical micro-service model ("template")

FIG. 2 illustrates an example of a typical micro-service model according to the invention. On the left-hand part of FIG. 2, a model of a micro-service is shown. The model includes three groups of sub-services. A first group represents the main sub-services which constitute the main (that is to say expected) functionality of the micro-service. A second group provides the utility sub-services needed for the management of the micro-service. Finally, a third group represents the Communication sub-service that serves to enable the micro-service to communicate with other micro-services, and therefore to be integrated into the platform.

With continued reference to FIG. 2, albeit with respect to the right-hand part of the figure, an example of a standardized generic structure is shown. The standardized structure of the micro-service (also referred to as micro-service template) is defined by the model. All the micro-services are based on this standardized structure. The top-most group includes one or more sub-services which represent the business function (business 1 and business 2 in the figure). The middle group includes five micro-service management functions. These functions include the following: a system event log function for logging events related to the operation of the micro-service (referred to as System logs); a business event log function for logging events concerning the business function (referred to as Operational logs or Op log); an alarm management function for managing alarms sent and received by the micro-service (referred to as Alarms); a configuration management function for managing the configuration of the micro-service (referred to as Config); and a save and restore function for saving and restoring the current state of the micro-service (referred to as Context). The bottom group shows the functions that are included in the messaging sub-service. The messaging sub-service includes a publish function for publishing in one or more messaging system topic(s) (named Publish-Subscribe); and a send request function for sending a request via the messaging system (named Request-Reply). It may additionally also include (not shown in FIG. 2) a subscription function for subscribing to one or more topic(s) of the messaging system; and a response function for responding to a request received via the messaging system. It should be understood that the messages sent/received that comprise a metadata item TYPE or even AUDIT will in particular be processed by the logging functions.

An example of implementation of the micro-service is further discussed. The implementation of the standardized generic structure may be undertaken in an object-oriented programming language, for example in C++. The business function may be implemented by a computer subroutine (named Main Program in the figure) which, when it is executed by the computer, performs the business function. The five micro-service management functions may be implemented by three computer subroutines. The first subroutine (named Syslog clients API) implements the two logging functions "System logs" and "Operational logs". The second subroutine (named Alarm lib) implements the "Alarm Management" function. A third subroutine (named "Protected directory in OS filesystem) may implement the "Config Handler" and "Context Handler" functions. The function of the third subroutine may be provided by the operating system of the computer executing the micro-service. It should therefore be understood that the sub-services of a micro-service may be those offered by the operating system of the computer executing the micro-service. The file system management service of the operating system is able to store and manage in a database the alarm messages sent/received by the micro-service as well as the current state(s) of the micro-service. Finally, the functions of the messaging sub-service may be implemented by means of the API ZeroMQ© discussed with reference to FIG. 4.

The typical micro-service model according to the invention therefore offers access to a standardized messaging system common to all the micro-services of the platform via a unified communication system which can use sockets for inter-process communication, either locally within the same given operating system of a computer, or via a network and a network protocol (for example TCP/IP), or a combination of the two. The common messaging system may use an asynchronous "Publish-Subscribe" communication scheme. Each micro-service can send data by publishing to the common messaging system, without needing to determine whether or not the data will be consumed. Each micro-service can receive data by subscribing to a data item published by another micro-service, without the publisher needing to be informed thereof. The communication can therefore be asynchronous, non-blocking, point-to-multipoint and multipoint-to-point.

The service platform according to the invention is able to manage the services of an industrial system. Among the examples of use of the platform, the latter implements a battery management system for managing a battery and its auxiliary equipment units. A battery is a generic term that refers to an assembly of electric accumulators, referred to as elements, which are linked to each other so as to create an electric generator having the voltage, power and capacity desired. A battery converts the electrical energy accumulated during the charging phase into chemical energy. The chemical energy is constituted of electrochemically active compounds disposed in the element. The electrical energy is restored by converting the chemical energy into electrical energy during the discharge phase. The electrodes, arranged in a container, are electrically connected to the current output terminals which provide for electrical continuity between the electrodes and an electrical consumer with which the element is associated. The battery is formed from one or more branch(es), the latter being electrically connected in parallel. Each branch comprises one or more module(s) electrically connected in series, with each module comprising one or more electrochemical element(s) electrically connected in series or in parallel.

Figure 6:
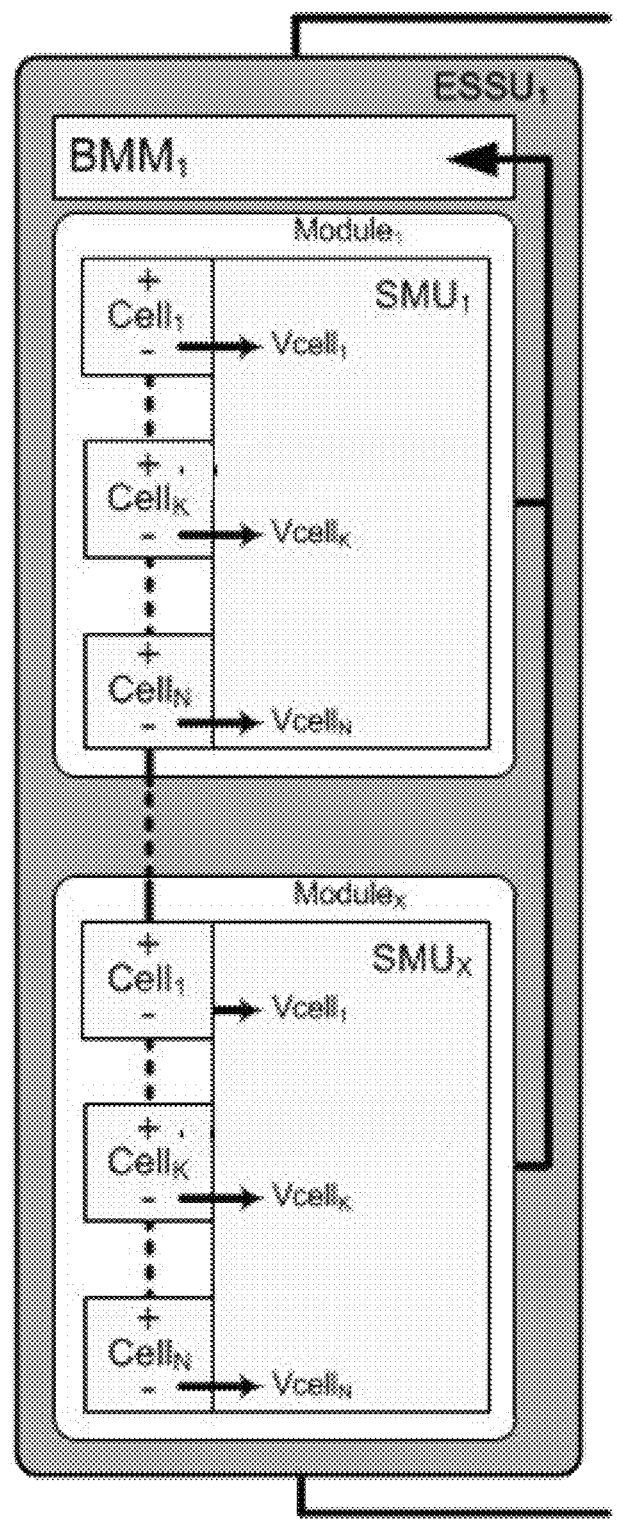
FIG. 6 is an example of a battery configuration for a battery that can be managed using the services platform.
Figure 7:
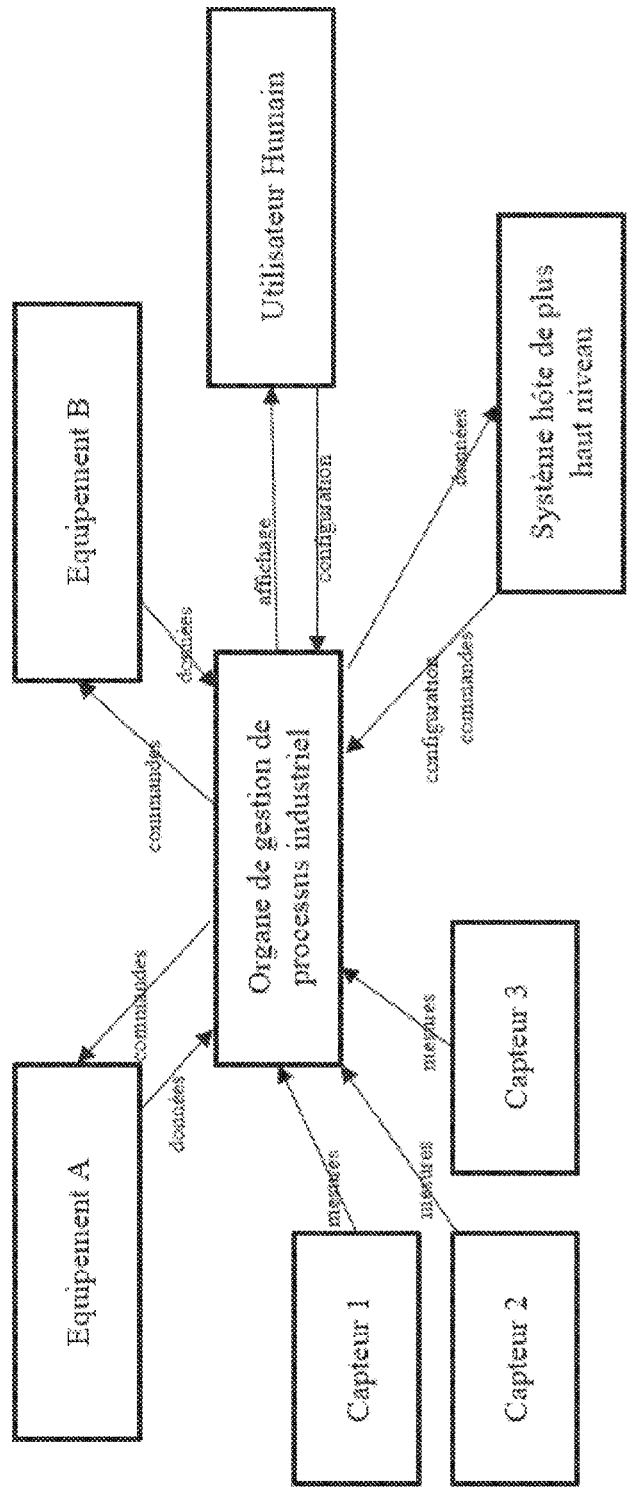
FIG. 7 illustrates the diversity of equipment units and services offered by a service platform.

FIG. 6 is an example of a configuration of a battery in which N electrochemical elements (Cell1, Cell2, . . . , CellN) are connected in series and arranged together in the same enclosure in order to form a first module (Module1). Similarly, N electrochemical elements are connected in series and arranged in an xth enclosure in order to form an xth module (Modulex). The X modules are connected in series in order to form a battery (Bat). The X modules constitute a branch of the circuit, referred to as ESSU (acronym for Energy Storage System Unit). The elements also are not necessarily connected in series but may also be connected in parallel. It is also possible to envisage certain elements being connected to each other in parallel in order to obtain a plurality of combinations of associated elements in parallel and then to connect these combinations of associated elements in series. Likewise, the battery may comprise any number of modules, in a configuration not necessarily limited to a connection in series. For example, the battery may include p parallel branches, each parallel branch comprising at least one module consisting of at least one element.

The auxiliary equipment units of a battery are equipment units that participate either in the safety, or security, or performance, or operation of the battery. In the examples, at least one auxiliary equipment unit of the battery is selected from the following: a fire detection and extinguishing system which prevents the spread of fire in the event of one or more electrochemical modules catching fire; an air conditioning system in order to maintain the battery in suitable temperature conditions that ensure its optimal operation; a physical access monitoring system for monitoring physical access to the battery (for example the site/room wherein the battery is stored); or indeed an electrical power measurement system for measuring the electrical power delivered and/or received by the battery.

Each auxiliary equipment unit is managed by one or more of the platform's micro-service(s) with responsibility for performing a business function. For example, the micro-service that manages the fire extinguishing system may notably have as its business function: measuring of the temperature around the battery; and in the event of a fire, sending of alarms to a micro-service that offers a user interface which provides the means to keep an operator informed of any problem with the battery. For example, the micro-service that manages the air conditioning system may have as its business function: checking and verifying of the proper operation of the air conditioning system; and in the event of a failure, sending of alarms. The business function of the micro-service associated with the physical access monitoring system may be to send messages having a level of criticality that is dependent on the persons entering the site/room where the battery is stored. The electrical power measurement system may be managed by a micro-service whose business function is to restore to the operator the consumption of electrical power at the battery terminals: for example the micro-service provides a web service as well computing the energy accumulated by the battery. It will be understood that a plurality of auxiliary equipment units may be managed by one or more same micro-services; in other words, the management of a plurality of auxiliary equipment units may be grouped together within one or more same micro-services.

It will be understood that the service platform according to the invention may be used so as to manage containers that are battery assemblies. The platform is able to manage the different branches of batteries of the container as well as the auxiliary equipment units. The platform makes it possible, for example, to send operating data to a logging micro-service. In particular, the service platform according to the invention makes it possible to aggregate the data obtained on a plurality of equipment units by sending them to a data logging micro-service, or even to a data storage micro-service for storing data in a database. Thus, the platform may manage a plurality of batteries, containers, and offer an aggregated view of the parameters that are common to these equipment units. In one example, each battery of a container includes an electrical power measurement micro-service for measuring the instantaneous electrical power delivered by the battery, with the entire set of batteries of one or more container(s) sending the data to a data aggregation micro-service that enables an operator to view the aggregated data, for example by using a web service of the same data aggregation micro-service for aggregating the data of the containers.

It will be understood that a service platform according to the invention makes it possible to facilitate the management of a battery and its auxiliary equipment units. Thus, the battery management functions that are conventionally implemented within the BMSs (Battery Management Systems, components that contribute to the management of batteries), may be moved out to the exterior of the batteries in order to simplify the design and use thereof. Notably, the computations of state of charge (SoC) and state of health (SoH) may be done with greater accuracy thanks to the far greater computing power of the service platform as compared to conventional BMSs.

In the examples, it is possible to form an assembly comprising one or more battery branch(es) connected in parallel and forming a battery, each branch of the battery comprising one or more module(s) connected in series, each module comprising one or more electrochemical element(s). The assembly also includes one or more computer(s), and a service platform according to the invention which is executed by the computers in the assembly. The micro-services of the service platform implement the battery management business functions for managing the battery and its auxiliary equipment units: for example for each battery management function of a battery and for each auxiliary equipment interface of the battery. The assembly also includes one or more control component(s) for control-command of the branches, which execute the connection/disconnection orders and which provide measurements of the parameters of the branches, the modules, and the electrochemical elements. A control-command component provides the means to supervise the electrical state of a branch, for example to open or close the circuit of the branch.

In the examples, at least one of the business functions may be selected from the following. The first business function is to determine whether one or more branch(es) of the battery is(are) connected to or disconnected from the electrical network, that is to say at the output of the battery. Another business function is to compute the current setpoints applicable to the charging and the discharging of the battery. A third business function is to compute the level of charge (SoC, acronym for State of Charge) of the battery; the micro-service therefore implements at least one algorithm that provides the means to measure or else to estimate the SoC. A fourth function is to compute the level of health (SoH, acronym for State of Health) or level of battery life; the micro-service therefore implements at least one algorithm that provides the means to measure or else to estimate the SoH of the battery.

In one example, a level or state of charge (SoC) and a state of health (SoH) for a branch of the circuit (ESSU) are computed by the BMS, and a level or state of charge (SoC) and a state of health (SoH) per battery are computed by the micro-services platform.

In the examples, the assembly comprises two or more assemblies of branches of batteries connected in parallel respectively forming two or more batteries. This assembly with at least two batteries may comprise a micro-service implementing a data aggregation business function for aggregating the data from one or more of the other business functions mentioned above. In other words, the data aggregation micro-service aggregates the data that pertains to each type of business function. It is to be understood that the data aggregation may be performed differently depending on the business function, and that there may be one aggregation micro-service per business function.

In the examples, the assembly may include one or more micro-service(s) capable of sending the data exchanged via the unified communication system to a remote storage system in order to be stored therein. The data exchanged may for example be selected by making use of one or more of the metadata items present in the messages conveying the exchanged data. The storage system may be, but is not limited to, a database, a file system, one or more storage server(s) forming a cloud. The remote storage system may be coupled with a machine learning system that is capable of effectuating its training on the stored data. The data received are therefore all observations that serve to enable constructing of a model, for example a model of battery wear.

In the examples, the service platform of the assembly in addition includes a service update micro-service for updating the other micro-services. In one example, the update micro-service can send requests to the other micro-services in order to determine the respective versions thereof, and based on the responses to the requests, it is able to determine the micro-services that need to be updated. In one example, the micro-services platform in addition includes a software update micro-service for updating the software programs of the control-command component(s) of the branches. The decision as to whether or not a control-command component is to be updated may be made in the same manner as with the updating of the micro-services.

The invention claimed is:

1. A service platform that is implemented by one or more computers, for managing a battery and its auxiliary equipment units, the service platform comprising:
    one or more micro-services, each micro-service having a standardized generic structure comprising:
        a sub-service implementing a business function; and
        a messaging sub-service; and
        a unified communication system for enabling exchange of data and messages,
    wherein:
        each micro-service further includes at least one micro-service management function, wherein the at least one micro-service management function includes a configuration management function configured to manage a configuration of the one or more micro-services;
(ii) the unified communication system comprises:
sockets configured to enable inter-micro-service communication, either local or via a TCP/IP network, the sockets being configured by the configuration management function for managing the configuration of the one or more micro-services and to enable inter-micro-service communication using a stateless proxy which connects a micro-service that is publishing one or more messages concerning one or more topics of a messaging system with one or more micro-services that have subscribed to the one or more topics of the messaging system; and
(iii) the messaging sub-service includes:
a subscription function for subscribing to one or more messaging system topics, wherein the subscription function includes subscribing to one or more topics of the messaging sub-service, formatting and writing the data contained in the messages associated with the one or more topics subscribed to a local database that is suitable for the storing of time-stamped data.

2. The service platform according to claim 1, in which each micro-service in addition includes:
a user and/or machine interface.

3. The service platform according to claim 1, wherein the at least one micro-service management function is selected from among:
a logging function of the unified communication system executing the one or more micro-services and/or the one or more micro-services being executed that includes the logging function;
an alarm management function configured to manage alarm(s) sent and/or received by the one or more micro-services;
a save and restore function configured to save and restore a current state of the one or more micro-services; and combinations thereof.

4. The service platform according to claim 3, further including a log centralization service on which are stored log messages formatted and sent by the logging function.

5. The service platform according to claim 4, wherein the logging function adds a metadata item to each log message formatted and sent by the logging function, the metadata item comprising:
a metadata item PRIORITY, that takes a value selected from the following values:
TRACE: the content of the message does not include any particular current event;
DEBUG: the content of the message includes information items relevant to a future current event;
INFO: the content of the message includes information items relevant to a current event;
WARN: the content of the message includes information items relevant to a problematic current event;
ERROR: the content of the message includes information items for a serious current event; or
CRITICAL: the content of the message includes information items for a current critical event,
a metadata item TYPE, that takes a value selected from the following values:
a value SYSTEM indicating a message linked to operation of the micro-service in question; or
a value OPERATIONAL indicating a message linked to the business functions;
a metadata item AUDIT, that takes a value selected from the following values:
a value TRUE, indicating that the message is to be treated as security related; or
a value FALSE, indicating that the message is to be treated as non-security related.

6. The service platform according to claim 1, wherein the messaging sub-service further includes:
a publish function for publishing to a topic of the messaging system;
a send request function for sending a request via the messaging system;
a response function for responding to a request received via the messaging system; and
combinations thereof.

7. The service platform according to claim 1, wherein the unified communication system is asynchronous, non-blocking, and point to multipoint or multipoint to point.

8. The service platform according to claim 1, wherein one or more additional services are provided by an operating system of one or more computers executing the one or more micro-services.

9. The service platform according to claim 8, wherein the one or more additional services are selected from among:
an operating system initialization service;
a micro-services start-up service; and
a central message storage and management service for storing and managing log messages in a database; and combinations thereof.

10. The service platform according to claim 1, that in addition includes a daemon executed by a computer, the daemon performing at least one of the following tasks:
determining whether or not the one or more micro-service(s) is (are) functioning correctly, and restarting the same as may be necessary; and
monitoring proper functioning of an operating system of the computer executing the one or more micro-services and restarting the operating system as may be necessary.

11. The service platform according to claim 1, wherein each micro-service is executed as a single process and each sub-service of the micro-service is executed as a thread.

* * * * *